United States Patent [19]

Kane

[11] Patent Number: 4,654,101

[45] Date of Patent: Mar. 31, 1987

[54] METHOD OF MAKING A CHANGEABLE DISPLAY SIGN

[75] Inventor: Michael Kane, Chicago, Ill.

[73] Assignee: Kane Graphical Corporation, Chicago, Ill.

[21] Appl. No.: 703,928

[22] Filed: Feb. 21, 1985

Related U.S. Application Data

[63] Continuation-in-part of Ser. No. 6,648,452, Sep. 6, 1984, Pat. No. 4,530,177, which is a continuation-in-part of Ser. No. 6,420,044, Sep. 20, 1982, abandoned.

[51] Int. Cl.[4] .................................... B32B 31/18

[52] U.S. Cl. .................................... 156/250; 40/595; 40/600; 40/618; 40/621; 156/258; 156/264; 156/265; 156/277

[58] Field of Search ............... 156/250, 258, 259, 264, 156/265, 266, 267, 277; 40/489, 618, 621, 584, 595, 600

[56] References Cited

U.S. PATENT DOCUMENTS

| | | | |
|---|---|---|---|
| 680,720 | 8/1901 | Lande | 40/618 |
| 1,936,634 | 11/1933 | Lorraine | 40/618 |
| 2,156,775 | 5/1939 | Zimmer | 40/618 |
| 2,539,609 | 1/1951 | Buckingham | 156/265 |
| 2,600,505 | 1/1952 | Jones | 40/621 |
| 3,126,645 | 3/1964 | Lloyd | 40/621 |
| 3,168,787 | 2/1965 | Surrey | 40/621 |
| 3,681,857 | 8/1972 | Yardley | 40/621 |
| 4,289,561 | 9/1981 | Holzknecht | 156/277 |

FOREIGN PATENT DOCUMENTS

| | | | |
|---|---|---|---|
| 2847590 | 5/1980 | Fed. Rep. of Germany | 40/621 |
| 1364469 | 8/1974 | United Kingdom | 40/621 |
| 1575534 | 9/1980 | United Kingdom . | |

*Primary Examiner*—Caleb Weston
*Attorney, Agent, or Firm*—Russell E. Hattis

[57] ABSTRACT

A method of making sign component pieces to be interfitted in close abutting relationship. The preferred method aspect of the invention involves imprinting upon one or more flexible rectangular translucent cover sheets successive horizontal bands of repeated sign-forming indicia, the indicia being precisely positioned with respect to two intersecting reference margins of the sheet. The cover sheets are then laminated to a thin flexible backing sheet capable of adhering subsequent to be severed component sign pieces to a component piece support surface. The resulting laminated sheet is then applied to individual cutting devices, each having an adjustable backstop positioned to effect a linear cutting operation spaced a distance therefrom equal to the horizontal or vertical extent of the component piece involved. The cutting devices are scissor-type shearing devices which forms a bevelled undercut so that the bevelling is identical for the top and right sides of each severed component piece and forms an opposite bevelled undercut along the left and bottom margin of each component piece formed therefrom.

18 Claims, 22 Drawing Figures

Fig 7
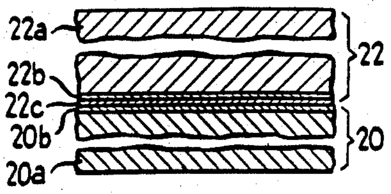
Fig 8
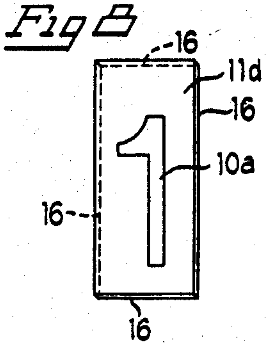
Fig 9
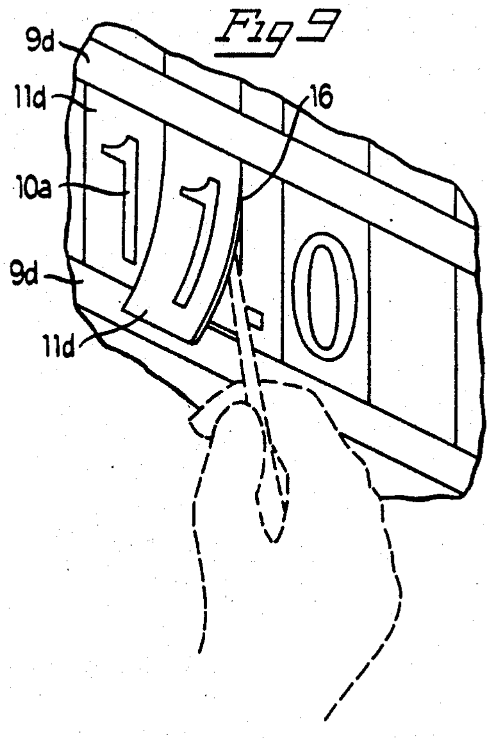
Fig 10
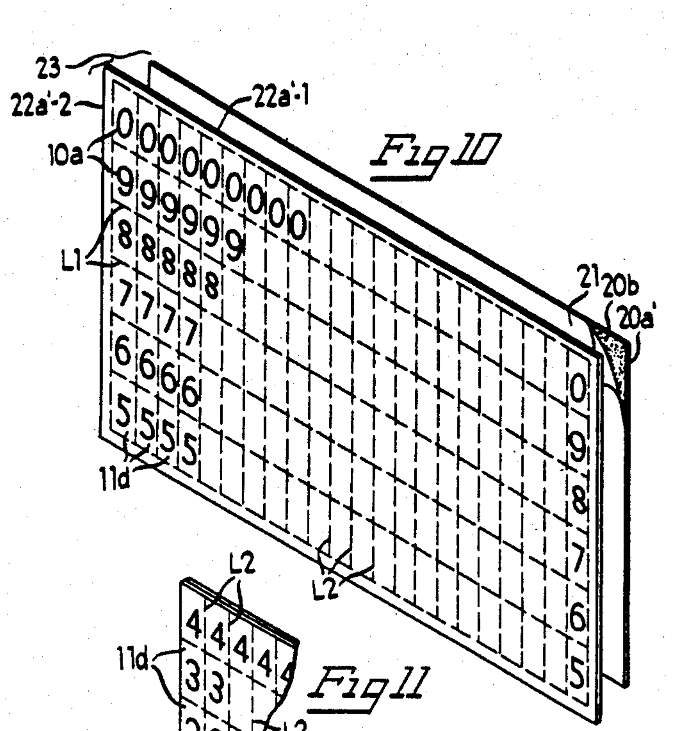
Fig 11
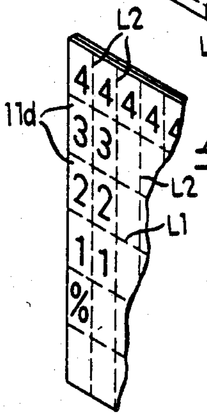
Fig 14
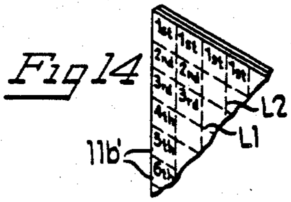
Fig 13
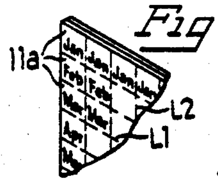
Fig 15
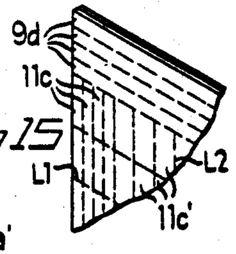
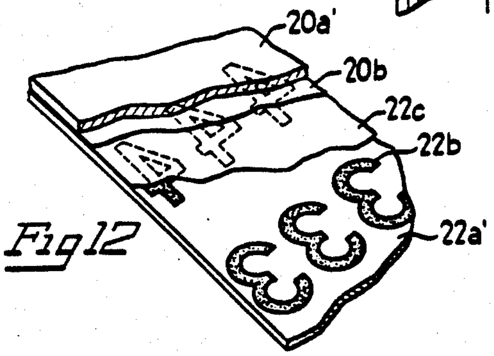
Fig 12

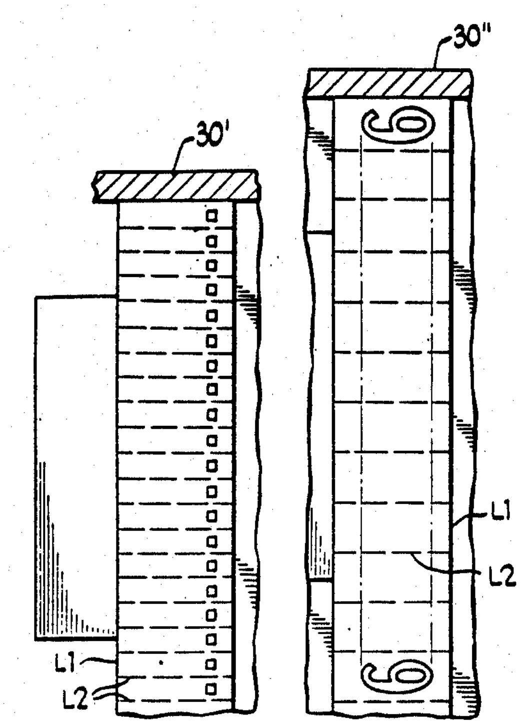
Fig 19
Fig 16
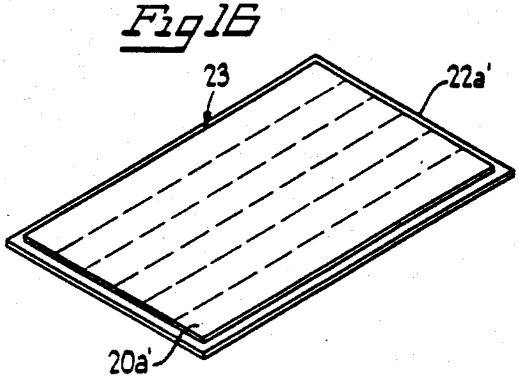
Fig 17
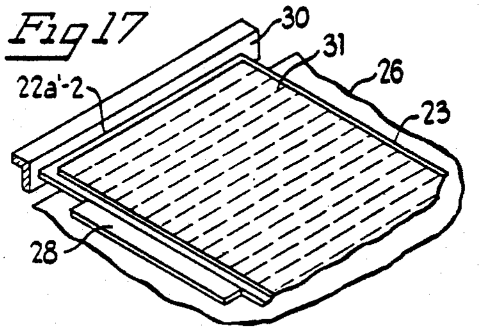
Fig 21
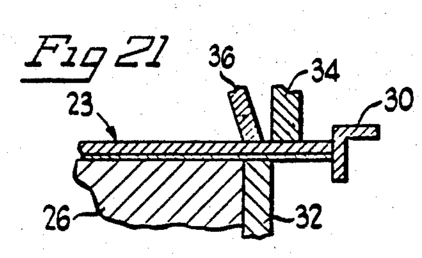
Fig 18
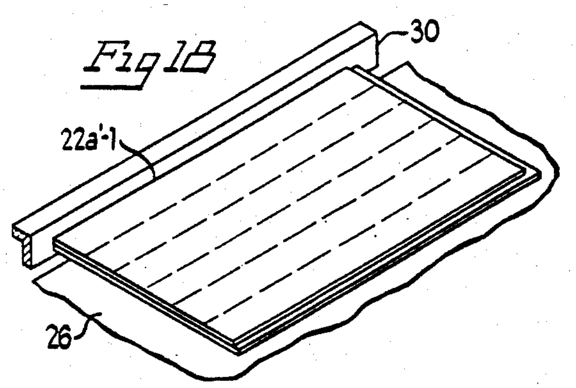

METHOD OF MAKING A CHANGEABLE DISPLAY SIGN

RELATED APPLICATION

This application is a continuation-in-part of U.S. application Ser. No. 06/648,452, filed Sept. 6, 1984, now U.S. Pat. No. 4,530,177 which is a continuation-in-part of U.S. application Ser. No. 06/420,044, filed Sept. 20, 1982, abandoned on Sept. 6, 1984.

TECHNICAL FIELD OF INVENTION

This invention relates to changeable signs, such as signs which are used in banks for identifying to the clients of the bank various current investment offerings, and the annual interest rates and annual effective yields provided thereby. However, the broader aspects of the invention apply to other types of changeable signs. The invention herein claimed deals with an accurate low cost method of making sign component pieces which can be easily placed on a mounting wall surface in intimate contact with other similar pieces so that the entire sign surface appears as a single sheet of material, and yet can be readily easily pulled from the wall surface and be replaced by other similar pieces containing different information.

PRIOR ART

The B. F. Goodrich Company has developed a flexible magnetic sheet material which can be directly printed upon, or which sometimes carries a pressure sensitive adhesive coating to which a transparent cover sheet is secured. Sign-forming indicia can be printed upon the front of this magnetic sheet material or the rear of the transparent cover sheet. Bank interest signs have been formed from these magnetic sheet materials into individual sign component pieces each forming a numeric digit attached to a metal support surface adjacent to other similarly attached numeric pieces to form an interest rate number. However, these bank interest signs left much to be desired from the standpoint of sign attractiveness and flexibility. Thus, the only portions of these signs which received the changeable indicia-forming sign component pieces present was the interest number section thereof, where the sign component pieces forming the same projected from the general plane of the rest of the sign around the same, which contained stationary unchangeable indicia identifying the investment security to which the interest rate number applied, and so the positioning choices of the interest rate numerals was limited by the position of the stationary indicia. Also, because the edges of the individual sign component pieces projecting from the sign were readily visible and accessible, it was not uncommon for unwanted visitors to the bank to grasp the exposed edges of the sign component pieces and rearrange them to the great consternation of the owners of the bank and their regular customers.

A changeable sign containing a large number of sign component pieces placed in close abutment to cover a large mounting area is disclosed in German Pat. No. 2,847,590. It appears that the confronting edges of these sign component pieces are transverse to the planes of the front faces thereof. Especially because of the practical limitations of manufacturing tolerances, it would be extremely difficult if not practically impossible to maintain an even vertical and horizontal alignment of alphanumeric characters on a sign made with these component pieces. Also, once these component pieces are assembled, if individual pieces are to be changed, it would be difficult to fit a new piece into the space left by the removal of an individual piece.

As will appear, the method of the invention is used to mass produce at low cost completely unique changeable component sign pieces which can be easily assembled together in precise horizontal and vertical alignment and where any piece can be removed and easily replaced by another similar piece.

SUMMARY OF THE CHANGEABLE SIGN TO WHICH THE METHOD INVENTION APPLIES

The preferred changeable sign to which the present method invention is most applicable comprises a magnet attracting support wall encompassing the area of the desired sign and having on either one or both sides thereof an initially exposed sign component-receiving surface to which individual sign component pieces can be secured preferably by magnetic attraction. The entire exposed area of this magnetic attracting wall surface which is to contain sign-forming indicia is covered with thin, flexible sign component pieces made by the method of the invention, and preferably having a backing made of said thin, flexible magnetic material. Some of these pieces supply only blank (i.e. preferably background supplying) spaces to the sign and others supply numeric or alphabet characters and the immediate background thereof. When all of the sign component pieces have been applied to the sign-forming support surface, the entire sign viewed from a short distance therefrom appears as a single sheet of material having one continuous printed front surface, even though, in reality, the front surface is made up of different types of individual sign component pieces to be described. The framing of the sign preferably covers the exposed edges of the outermost sign component pieces of the design.

Since the confronting edges of the various sign component pieces described are in immediate contiguous relationship, it does not appear even to one viewing the sign closely, where the margins of the individual sign component pieces are barely visible, that they can be removed from the sign at any point where desired. However, the thin, flexible sign component pieces to which the invention relates are individually removable, as by use of a suction cup, or by a thin blade removal tool which can be readily wedged between adjacent sign component pieces. To enable this tool to readily peel a corner portion of a sign component piece from the support wall surface and, more importantly, to enable the various pieces to be easily and neatly interfitted into or removed and replaced from the sign, two of the corresponding marginal edges of each piece (i.e. the top and right side) are identically undercut, as by beveling the same, and two of the other corresponding edges of each piece (i.e. the left and bottom side) are oppositely undercut. This beveling can be readily unexpectedly made to close tolerances by a scissors cut which constitutes one method aspect of the invention. This enables the pieces to be readily closely interfitted in precise vertical and horizontal alignment and to be separated with ease. This is not practically possible with square cut edges which could not be practically made with small enough tolerances to be easily interfitted or separated if forced tightly together, as they must to present a continuous appearing sign surface.

Where the sign made by the present method invention is a bank interest sign, the sign preferably includes row and column header strip pieces having complete word-forming indicia identifying the nature of the sign information contained in various horizontal information bands and vertical column portions thereof. There may also be provided a main header strip piece to be placed at the top of the sign to identify the institution involved and the type of information contained on the sign. These header strip pieces contain information which are changed, if at all, only occasionally.

Another type of sign component piece utilized in the bank sign is a relatively narrow piece which contains a numeric digit, decimal point, percent sign, or the like, which is changed or re-positioned frequently. The decimal point piece is the narrowest piece, and the numeric and percent sign pieces are wider and preferably of identical size. Many such pieces are supplied each user for frequent change of interest rate information in the various information bands of the sign. These sign component pieces and associated row header strip pieces preferably extend the identical full height of a standard sized information band of the sign. There is also provided narrow blank spacer sign component pieces of at least two different widths to give a choice of indicia separation distances. Blank spacer strips preferably extending a substantial proportion and preferably the full length of an information band are distributed throughout the sign and separate successive information bands of the sign to provide parallel top and bottom edges along which the indicia-containing component pieces are aligned to assure good horizontal alignment of the sign information.

Another type of changeable bank sign component piece preferably provided are relatively narrow and short sign component pieces containing month and day indicia to identify the term of the particular interest rate involved. Such pieces may, for example, be half the height of an information band of the sign and be positioned one above the other so as together occupy the height of a single information band of the sign.

It is believed that no one has successfully heretofore made a sign of the type described where near perfect vertical and horizontal alignment is achieved since it is not an easy matter to make the individual sign component pieces to almost the same size (i.e. to tolerances of plus or minus 0.005"). The various aspects of the method invention to be later described makes this readily possible at low cost. This unique method will be described in the specification to follow.

DESCRIPTION OF DRAWINGS

FIG. 7 is a fragmentary very greatly enlarged sectional view through one of the sign component pieces referred to showing the different layers making up each sign component piece, and the coatings applied to these layers;

FIG. 8 is a view of one of the sign component pieces;

FIG. 9 is a fragmentary perspective view of a portion of the bank interest sign of FIG. 1 as the sign component piece is being removed therefrom;

FIG. 10 illustrates the method aspects of the invention and is an exploded view of a numeral letter form sheet and a sheet of pressure sensitive-coated magnetized material with a pull-off cover sheet over the adhesive thereof, which sheets are laminated together to form a letter form matrix to be cut into smaller sign component pieces to be used with the sign of FIGS. 1–9;

FIG. 11 is a fragmentary perspective view of a trimmed letter form matrix formed from another letter form sheet laminated to a magnetized backing like that shown in FIG. 10 and from which numeral, percentage sign and decimal point sign component pieces are cut for use in the bank sign illustrated in FIGS. 1–9;

FIG. 12 is a broken away fragmentary perspective view of a portion of the matrix of FIG. 11 showing the various layers and coatings making up the same;

FIG. 13 is a fragmentary perspective view of a letter form matrix formed from a month letter form sheet laminated to a magnetized backing like that shown in FIG. 10 and from which month-indicating sign component pieces for use in the bank sign illustrated in FIGS. 1–9;

FIG. 14 is a fragmentary view of a letter form matrix formed from a letter form sheet which is laminated to a magnetized backing like that shown in FIG. 10 and from which date-indicating sign component pieces are cut for use in the bank sign of FIGS. 1–9;

FIG. 15 is a fragmentary perspective view of a matrix formed from a blank, spacer sign component piece-forming sheet laminated to a magnetized backing like tht shown in FIG. 10, and from which sheet the various spacer sign component pieces are cut for use in the bank isgn of FIGS. 1–9;

FIG. 16 is a view of any of the matrices of FIGS. 11, 13, 14 and 15 as viewed from the backing sheet side of the matrix and before the same has been trimmed;

FIG. 17 is a perspective view of a sheet support platform of a shearing device, to which one of the sign component-forming magnetic matrices described is placed in making a first trim cut along a side reference edge thereof, the side and top reference edges thereof being positioned respectively against a backstop and a side guide thereshown;

FIG. 18 is a view of the shearing device shown in FIG. 17 where the matrix shown in FIG. 15 has been rotated 90 degrees and placed so that the top reference edge of the matrix is placed against the backstop shown in FIG. 17;

FIG. 19 shows a different shearing device designed for cutting individual numeral, letter, percent sign or spacer pieces from a strip severed from a matrix thereof, there being two sections of the shearing device illustrated to show how pieces of different widths are cut using two different separately adjustable backstops and common shearing blades;

FIG. 21 is a sectional view through the support table of any of the shearing devices shown in FIGS. 17–19 and illustrate the movable and stationary cutting blades, backstop and holddown bar of the shearing devices involved.

DESCRIPTION OF EXEMPLARY BANK SIGN AND METHOD OF MAKING THE SIGN COMPONENT PIECES THEREOF

Figure 1:
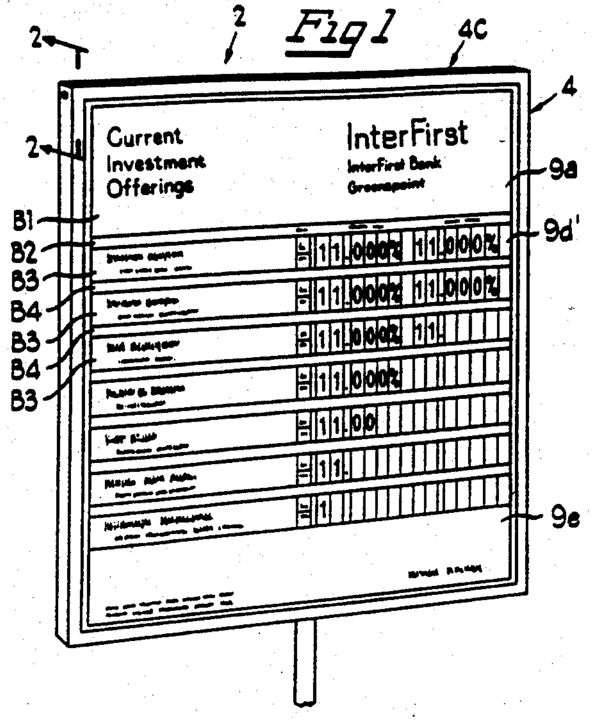
FIG. 1 is a perspective view of a pedestal-type sign with sign component pieces made in accordance with the present method invention.
Figure 2:
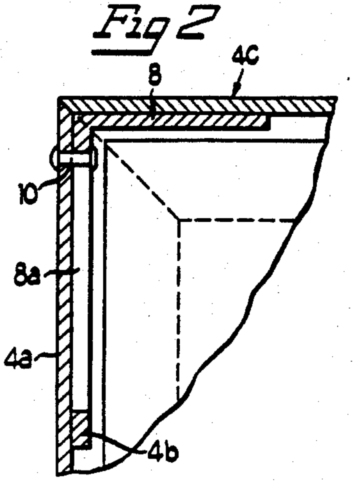
FIG. 2 is a fragmentary vertical sectional view through the upper left hand corner of the sign shown in FIG. 1, taken along section lines 2—2.
Figure 3:
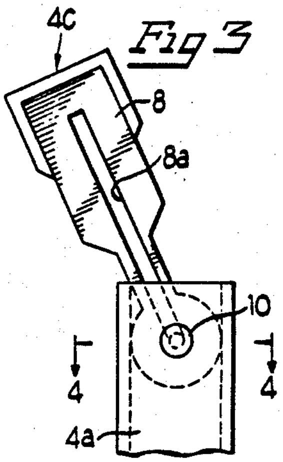
FIG. 3 is a view of the portion of the sign shown in FIG. 2, with the movable upper cover strip of the frame raised and pivoted to expose a slot for receiving a sign component piece support wall having sign components constructed and arranged in accordance with the present invention.
Figure 4:
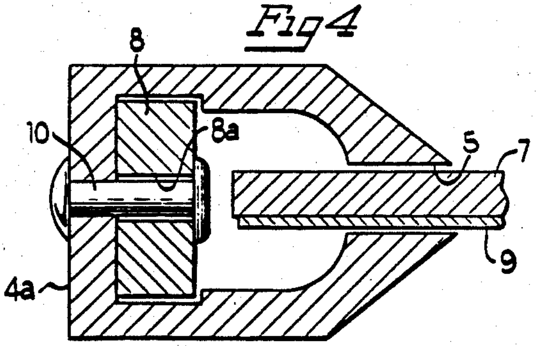
FIG. 4 is an enlarged fragmentary horizontal sectional view through the portion of the sign shown in FIG. 3, taken along section line 4—4 therein.

Referring now to FIG. 1, there is shown a sign 2 for use in a bank or other savings institution for identifying the different types of investment certificates and the annual rates and annual yields applicable through the stated month and date. The sign includes a support frame 4 which can have any desired construction. As illustrated, it has side strips **4*a*—4*a* connected at the bottom thereof by a bottom frame strip 4*b* and at the top by a swingable cover strip 4*c* which is pivotable as shown in FIG. 3 to expose a vertical track or slot 5. The slot 5 slidably receives a vertical metal sign component support wall 7 adapted to carry on one or both faces thereof sign component pieces 9 and 11 formed of narrow pieces or elongated strips to be described, each including a magnetizing backing layer which magnetically adheres the same to the support wall 7. After the support wall 7, is dropped into the slot 5 where it comes to rest upon the bottom frame strip 4*b*, the cover strip 4*c* is pivoted back into place to close off the slot 5. The ends of the strip 4*c* illustrated have secured thereto angle members 8—8 having horizontally extending legs 8*a*—8*a* welded or otherwise secured to the cover strip and depending legs 8*b*—8*b* each having a vertical slot 8*c* therein to receive a pivot and guide pin 10 projecting inwardly from the upper end of the adjacent side frame strip 4*a*. The cover strip 4*c* is thusly slidable and pivotable with respect on the pins 10—10 between a lowered position where the strip 4*c* is contiguous to the upper ends of the side frame strips 4*a*, and an elevated position shown in FIG. 3 which exposes the guide slot 5 as described. The present invention deals primarily with the shapes, constructions, and arrangements of the sign component pieces which form a unique sign having one or two sign-forming face thereof, each of which appears from ordinary viewing distance to have a continuous, flat surface having printed indicia thereon. It should be understood that the sign component pieces 9 and 11 occupy an entire desired sign-forming area on one or both faces of the support wall 7, which area may encompass the entire vertical extent of the face of the support wall involved, as in the illustrated sign, or a partial portion of the height thereof, in which event the bottom portion of the sign-forming portion of the support wall 7** would be closed by a magnetized metal bar or the like, which extends along the bottom margin of the bottommost sign component pieces.

In the case of signs for banks identifying the interest rates for various types of investment certificates, as shown best in FIG. 1, the sign 2 of the invention generally has a main upper information band B1 identifying the subject matter thereof, namely "Current Investment Offerings" of the bank or other institution involved. This area of the sign is formed by a main header strip **9*a* which, like the other sign component pieces, is a thin, flat, rectangular and flexible piece with a magnetized backing adhering the same to the face of the support wall 7. The side and top margins of the strip 9*a*** adjacent to a portion of the frame are preferably covered over thereby so that the edges thereof are not exposed.

Figure 5:
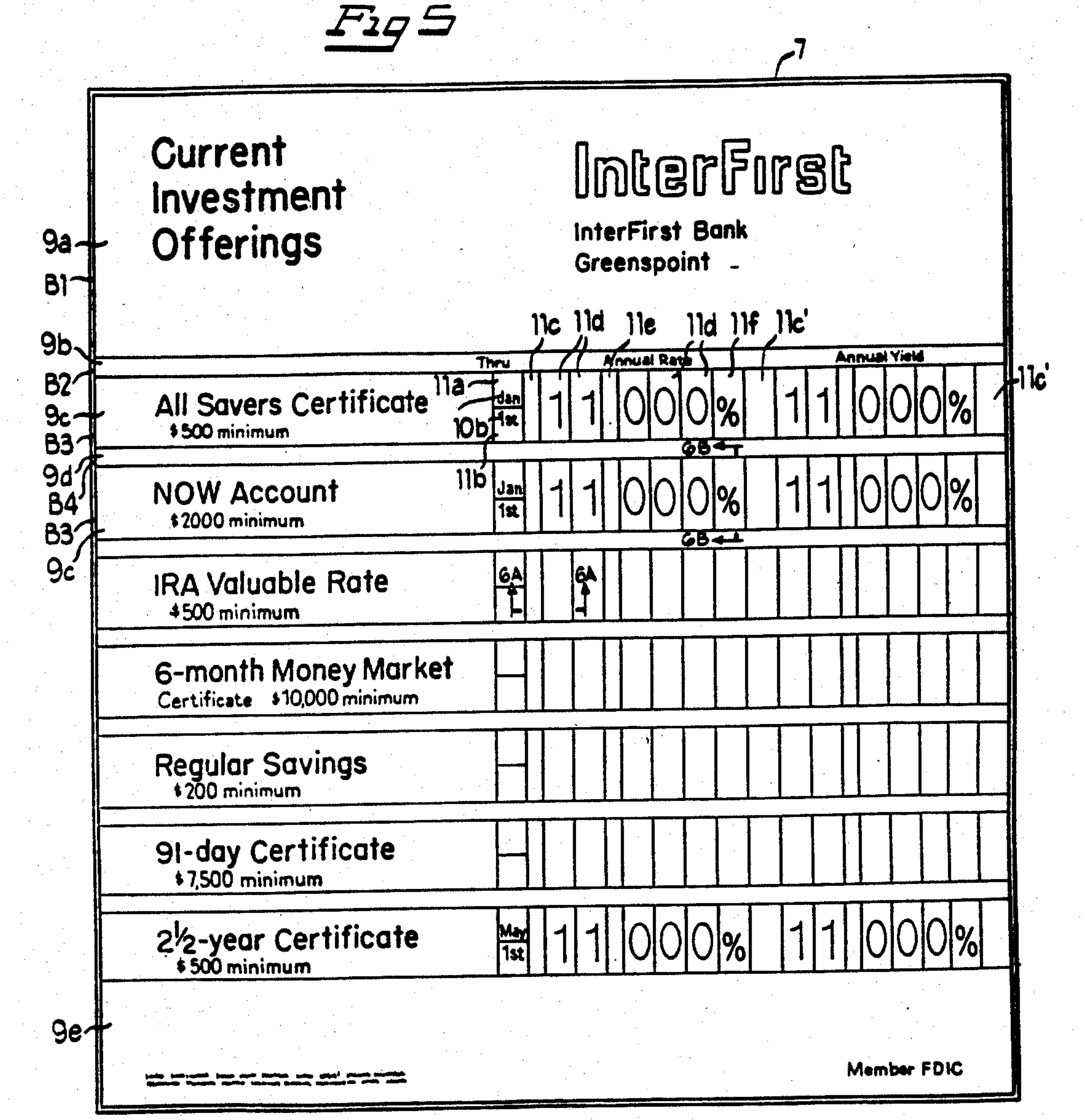
FIG. 5 is a front elevational view of the sign component piece support wall and the sign component pieces supported thereon for the sign shown in FIG. 1, with the frame portions of the sign removed from the figure.

The sign 2 also has numerous other horizontally extending information bands or areas containing various kinds of information. Thus, immediately below the main information band B1 is a column information band B2, which may contain the words "Thru" as shown in FIG. 5, identifying a month and date column of the sign, and "Annual Rate" and "Annual Yield" indicia identifying the subject matter of the two vertically aligned columns of numbers appearing in various horizontally extending interest rate bands B3. The column information band B2 may be formed from a single horizontally elongated thin, flexible sign component strip **9*b* constructed like the row header strip 9*a*** and other sign component pieces to be described hereafter.

The interest rate bands B3 contain at the left hand portion thereof a region extending only a fraction of the full width of the sign and formed from a row header strip **9*c* which identifies the type of investment offering or certificate involved. As best shown in FIG. 5, to the right of row header strip 9*c* is a pair of vertically spaced month and date indicating sign component pieces 11*a* and 11*b*. These sign component pieces 11*a* and 11*b* are shown as being of identical size, each occupying one half of the height of the interest rate band B3 involved. All of the interest rate bands B3** are shown as having identical height to form a sign of maximum attractiveness and neatness.

Immediately contiguous to the right of the month and date sign component pieces **11*a* and 11*b* is a narrow, blank, spacer-forming sign component piece 11*c*. Each interest rate band B3 has an identical sign component piece to the piece 11*c* shown. To minimize the number of different size pieces to be used, it is preferred to have two basic types of narrow spacer sign component pieces, namely the narrowest spacer piece 11*c* just described and one twice the width thereof, namely the spacer sign component piece 11*c*' shown at the end of the interest rate band B3 in FIG. 5. A similar spacer sign component piece 11*c*'** is placed between the two sets of interest rate information identified previously, in the "Annual Rate" and the "Annual Yield" columns of the sign.

To the right of the narrow spacer sign component piece **11*c* and the next spacer piece 11*c*' are a series of numeral and decimal sign component pieces, the numeral pieces being identified by reference numeral 11*d* and the decimal sign component piece being identified by reference numeral 11*e*. Finally, each of the interest rate bands B3 of the sign will have a percent sign component piece 11*f* following each multidigit number in the interest rate and interest yield columns of the sign. Each of the sign component pieces 11*a*, 11*b*, 11*c*, 11*c*'**, 11*d*, 11*e* and 11*f* are individually removable from the sign in a manner to be described.

To minimize the cost of fabrication of the sign component pieces and to simplify the manufacture thereof in a manner to be described, all of the row header strips 9*c* at the beginning of each interest rate band B3 preferably will be of identical width and height and all of the spacer, numeric, decimal point and percentage sign component pieces except the month and date pieces 11*a* and 11*b*, preferably will have identical heights. Except for the decimal sign component pieces 11*e*, which have an identical width to the narrow spacer sign component pieces 11*c*, the other small sign component pieces, namely the numeric, percentage spacer, month and date sign component pieces 11*d*, 11*e*, 11*c'*, 11*a* and 11*b* preferably will have identical widths.

In order to provide a sign which has a maximum information band spacing flexibility, it is most advantageous to distribute through the sign horizontally elongated sign component spacer strips 9*d* each of which extend an appreciable portion preferably the full width of the sign face. In the former case, two or three strips would fill an entire horizontal band. Also, the strips are preferably a fraction of the height of the interest rate bands B3. The strips 9*d* will generally separate the interest rate information bands B3 formed by the row header strips and the small sign component pieces just described. These strips present parallel top and bottom aligning edges for the sign component pieces above and below the same so that good horizontal alignment of the indicia-containing sign component pieces is achieved.

At the very bottom of the indicia-carrying portion of the sign, there may be provided a horizontally elongated sign component strip 9*e* which can be a blank strip or a strip containing additional information which the bank or other financial institution desires to communicate to its customers.

As previously indicated, each of the sign component pieces described has an identical thickness and construction to be described, which enables the pieces to be placed in immediate contiguous relationship to the adjacent sign component piece to the right, left, above or below the same, so that from a few feet away the front surface of the sign appears to be a continuous surface of a printed sheet of material. Also, their construction permits an easy sign change by removing individual pieces with ease and replacing them easily with other similarly sized pieces. A sign of this type could not be made as a practical matter unless the pieces could be economically fabricated to precise tolerances and related in a manner such that they can be readily peeled one piece at a time from the surface of the support wall 7. FIG. 9 shows the manner in which an individual sign component piece can be removed from the support wall 7, such as by the use of a suction cup or by a thin blade edge tool which is pushed into the space adjacent sign component pieces. Because of the undercut shape of the sides of these pieces, preferably formed by bevelling the edges thereof in a scissors edge shear cutting operation, the tool can then be twisted to bring the tool blade edge behind the magnetic backing of the piece involved, where a forward pull on the tool flexes the edge portion of the sign component piece forwardly from the support wall.

Referring now more particularly to FIG. 7, each of the sign component pieces comprises a relatively thin magnetic backing layer 20 which includes a main body portion 20*a* advantageously coated with a pressure sensitive adhesive 20*b*. The main body portion 20*a* of the magnetic backing layer 20, which preferably has a consistency of flexible rubber, can be a product like this manufactured by the B. F. Goodrich company as previously indicated. For example, the body portion 20*a* of the magnetic backing layer 20 may have a thickness of about 0.020".

Each sign component piece also preferably has a cover layer 22 having a main translucent body portion 22*a* which may be a 0.010" thick polycarbonate, or other similar material, sold under the name Lexan and manufactured by General Electric Company. The main body portion 22*a* of the translucent cover layer has photo screened printed on the inner face thereof a first indicia-forming coating 22*b* on the inner face thereof, and a silk screen printed background color-forming coating 22*c* thereover. A cover layer of this thickness does not follow the depressions and undulations in the outer surface of the magnetic backing layer 20, as could be the case if the main body portion 22*a* were a fraction of this thickness.

Figure 6A:
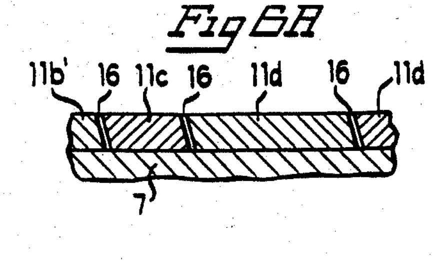
FIG. 6A is a greatly enlarged fragmentary vertical sectional view through the support wall and sign component pieces supported thereon, as seen along section line 6A—6A in FIG. 5.
Figure 6B:
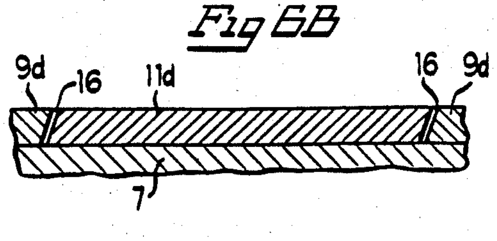
FIG. 6B is a fragmentary horizontal sectional view through the same section of the sign referred to, as seen along section line 6B—6B in FIG. 5.

As previously indicated, of importance to permit the individual sign component pieces to be readily peeled from the support wall 7 is the fact that the confronting surfaces of the adjacent sign component pieces are beveled as shown by the bevelling 16 in FIGS. 6A and 6B. This bevel is automatically formed when conventional shear-type devices commonly used to shear through metal sheets are used to shear through the laminated sheets now to be described, from which the sign component pieces are made.

FIG. 12 shows the rear of a laminated letter from matrix form which the various sign component pieces 9 and 11 described are preferably formed. Each matrix comprises a cover layer sheet 22*a'* of polycarbonate or the like having the thickness of the main body portion 22*a* of the front cover layer 22 of each sign component piece to be cut therefrom. The sheet 22*a'* is laminated to the pressure sensitive coating 20*b* of a magnetic backing layer sheet 20*a'*, from which is formed the main body portion 20*a* of the magnetic backing layer 20 of each sign component piece to be cut therefrom.

The cover layer sheet 22*a'* is made to a precise, dimension, with the top marginal edge 22*a'*-1 and the left marginal edge 22*a'*-2 as viewed from the front of the sheet being reference edges thereof from which the various indicia printed on the sheet is precisely located so that after a trim cut of, for example, ¾" is made the corresponding top and left margins of the various indicia-containing areas thereof are identically spaced. The magnetic backing layer sheet 20*a'* is covered by a protective sheet 21 which protects the pressure sensitive adhesive coating 20*b*. When this protective sheet is removed, a cover layer sheet 22*a'* is laminated to the coating 20*b* of the magnetic backing layer sheet 20*a'* to form a laminated letter form matrix 23. The backing layer sheet 20*a'* of each matrix is somewhat smaller than the associated cover layer sheet 22*a'* thereof so that it is located within the margins of the cover layer sheet, as shown best in FIG. 16. The cover layer sheet 22*a'* of each matrix preferably is made oversized before it is applied to the shearing devices to be described, so that initially the trim cuts are made along cut lines spaced from the reference edges 22*a'*-1 and 22*a'*-2 and falling within the margins of the backing layer sheet 20*a'*. These trimming operations are shown in FIGS. 17 and 18.

Figure 20:
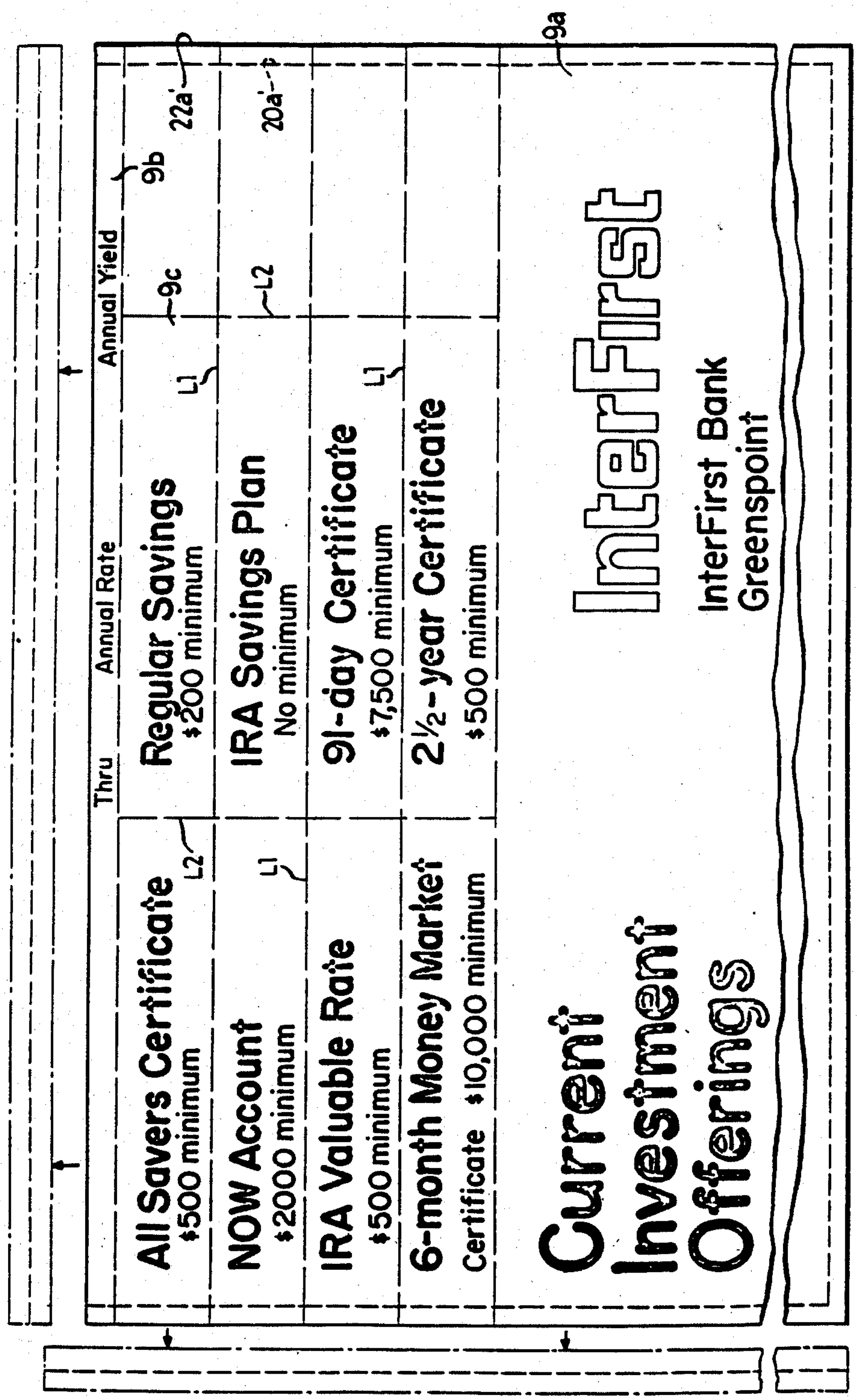
FIG. 20 is a front view of a letter form matrix from which all of the header strips in FIGS. 1 and 5 are formed and after it is trimmed, and shows in dashed lines the various lines along which this matrix is cut to form the various sign component pieces involved.

The shearing device S1 partially shown in FIGS. 17 and 18 has a table 26 upon which the laminated matrix 23 is placed, with the cover layer sheet 22a' face down upon the table 26 and with an edge thereof against an adjustable backstop 30. The matrix 23 is placed on table 26 so that the cover layer sheet 22a' is face down because, otherwise, the magnetized backing layer sheet 20a' could not be readily moved into position when the table is made of a magnetic field attracting metal like steel, since then the matrix would be difficult to move into position against the backstop 30. In the first trim cut shown in FIG. 17, the matrix 23 is fed so that the reference side edge 22a'-2 abuts against the backstop 30 of the device and so that the reference edge 22a'-1 extends along the straight inner edge of a guide strip 28 extending at right angles to the backstop 30. This trim cut, for example, could be a ¾" trim cut. In the second trim cut shown in FIG. 18, the top reference edge 22a'-1 is pushed against the backstop 30 and a similar (¾") trim cut is made. The resulting matrix is shown in FIG. 20 for a cover letter form matrix made for the header strips. The trimmed matrix is then ready for shearing along horizontal or row cut lines L1 and vertical or column cut lines L2 as shown in dashed lines in FIGS. 10, 11, 13, 14, 15 and 20.

After the two trim cuts are made on a letter form matrix, the matrix is then ready for severance first along the various horizontal cut lines L1 which for most of the sign component pieces are spaced an interest rate band width apart (e.g. 1¾") to form strips from the matrix involved. A shearing device (or shearing device section) is provided for each different sign component piece dimension. Once a backstop position of a shearing device is fixed precisely, it can remain in such position. Next, the various strips formed from the matrix are cut transversely along transverse cut lines L2 spaced apart a distance equal to the width of the desired sign component piece involved. For numeral, month, date, percentage and wider spacer sign component pieces, the cut lines L2 are closely spaced (e.g. ¾" apart).

In the case of the decimal point sign component pieces 11e and the narrow spacer pieces 11c, these are applied to a shearing device precisely adjusted to cut the desired widths, such as ⅜". The month and date sign component pieces 11a and 11b have the same widths of the numeral sign component pieces, such as ¾" but half the height thereof (e.g. ⅞").

FIG. 19 illustrates a shearing device S2 having two adjustable backstops 30' and 30" which are adapted respectively to form cuts along cut lines L2—L2 spaced apart respectively ⅜" and ¾" necessary for cutting the decimal, spacer, numeral and percentage sign component pieces in the example of the invention now being described.

FIG. 15 shows the matrix 23 from which spacer pieces are formed and thus contains no indicia, although it has the same background color as in the indicia-carrying sign component pieces. (The preferred background color of all sign component pieces is a dark color like black, contrasting to a light indicia color, like white, because the dark background color blends best with the normally relatively dark lines appearing at the juncture of adjacent sign component pieces because of shade effects or the dark brown color of the magnetic backing layer which appear at the sides of these pieces). The cut lines L1 and L2 formed on this matrix for forming the various spacer pieces of course will follow cut lines required for spacer strips 9d extending the full sign width and the narrow ⅜" and ¾" spacer pieces 11c and 11c' previously described.

FIG. 20 shows a trimmed matrix from which all of the header strips previously described and formed by shearing along the various cut lines L1 and L2 thereof.

A customer for a particular sign will receive a kit containing a desired number of sign component pieces comprising spacer and header strips and the smaller blank spacer pieces, and pieces having numbers, decimal points, percentage signs, date and month indicia thereon.

FIG. 21 shows a typical shearing device useable for devices S1 and S2. It includes the table 26, a stationary bottom knife edge 32 having a flat top edge, an upper movable shearing blade 34 which acts a scissors blade having a flat bottom edge, and a hollow bar 36. A backstop 30 is supported for adjustment in any well known way for movement in the direction of the arrow 30.

Both the structural and method aspects of the invention described cooperate to produce a unique sign system. Utilizing separate shearing devices or shearing device sections with individual precisely adjustable backstop for the different cutting distances required, precisely dimensioned thin, flexible, bevelled sign component pieces are formed which, when closely interfitted together, form perfectly aligned rows and columns of numbers heading indicia, which give the appearance that the sign has a continuous outer face, while permitting the easy removal of the individual thin flexible sign component pieces from the support wall 7 involved. Also, since the silk screen printing of the background and indicia is on the inner faces of the translucent cover layer of the sign component pieces, the indicia involved is protected from damage and wear.

I claim:

1. A method of making a changeable sign kit to contain relatively infrequently-to-be changed portions to constitute row heading information and frequently-to-be changed portions to constitute numerical data to be positioned in vertically spaced horizontal bands extending across the sign to the right of such heading information, said method comprising the steps of: imprinting on a face of a thin, flexible, rectangular translucent cover sheet successive horizontal bands of heading indicia, said heading idicia being precisely positioned with respect to two intersecting reference margins of the sheet and sharing common cut reference lines, so tht severing said sheet along three or more successive cut lines completely separates two or more bands of such indicia from the sheet to form two or more row header strips of the exact desired vertical extent; laminating said cover sheet to a thin, flexible attachment backing sheet capable of adhering the subsequently-to-be severed row header strips to a sign component piece support surface to form a thin, flexible, laminate matrix, said backing sheet having margins which after lamination to the cover sheet do not extend beyond said intersecting reference margins of the cover sheet; imprinting respectively on one or more thin, flexible, rectangular translucent cover sheets successive horizontal bands of repeating numeric digits 0–9, said numeric digits being precisely positioned with respect to two intersecting reference margins of the sheet and sharing common cut lines, so that severing said sheet along three or more successive cut lines completely separates two or more bands of such numeric digits of the exact desired vertical extent; laminating each of said one or more latter cover sheets to a thin flexible attachment backing sheet capable of adhering the subsequently-to-be severed numeric digits to said sign component piece support surface, to form one or more thin, flexible, laminated matrices, said backing sheet having margins which after lamination to the cover sheet do not extend beyond said inersecting reference margins of the cover sheet; and severing said laminated matrices first along said cut lines to form strips of such heading indicia and numeric digits and then cutting said strips, where necessary, transversely of the strips to form the individual row heder strips, and individual relatively narrow numeric digit sign component pieces; said severing of said laminated material containing said heading indicia and numeric digits being accomplished by cutting devices each having a backstop parallel to the line of cut and against which the previously cut reference margin or cut edge of the matrix involved is placed, the cutting devices each having a cutting edge parallel to and spaced a distance from said backstop to cut along the next cut line to cut a strip or piece of the desired size, the initial cut of each matrix when oriented for cutting parallel to said cut lines or transversely thereto being accomplished by placing the reference margin involved against said backstop of the appropriate cutting device and then severing the matrix.

2. A method of making component sign pieces to constitute numerical data to be positioned in vertically spaced horizontal bands extending across the sign, said method comprisng the steps of: imprinting respectively on one or more thin, flexible, rectangular translucent cover sheets successive horizontal bands of repeating numeric digits 0–9, said numeric digits being precisely positioned with respect to two intersecting reference margins of the sheet and sharing common cut lines, so that severing said sheet along three or more successive cut lines completely separates two or more bands of such numeric digits of the exact desired vertical extent; laminating each of said one or more cover sheets to a thin flexible backing sheet capable of adhering the subsequently-to-be severed numeric digits to a sign component piece support surface, to form one or more thin, flexible, laminated matrices, said backing sheet having margins which after lamination to the cover sheet do not extend beyond said intersecting reference margins of the cover sheet; and severing said laminated matrices first along said cut reference lines to form strips of numeric digits and then cutting said strips, where necessary, transversely of the strips to form individual relatively narrow numeric digit sign component pieces, said severing of said laminated material containing said numeric digits being accomplished by cutting devices each having a backstop parallel to the line of cut and against which the previously cut reference margin or cut edge of the matrix involved is placed, the cutting devices each having a cutting edge parallel to and spaced a distance from said backstop to cut along the next cut line to cut a piece of the desired size, the initial cut of each matrix when oriented for cutting parallel to said cut lines or transversely thereto being accomplished by placing the reference margin involved against said backstop of the appropriate cutting device and then severing the matrix.

3. The method of claim 1 or 2 wherein each of said backing sheets is of a smaller size than the associated cover sheet and is laminated thereto so that all of its intersecting reference margins fall within said margins of the cover sheet.

4. The methods of claim 1 or 2 wherein each backing sheet is a magnetic material which, when the sign component pieces are formed from the resulting matrix, is capable of adhering the associated sign component sheet to a magnet-attracting support surface.

5. The method of claim 2 wherein said imprinting is formed on the inner face of said cover sheets.

6. The method of claim 5 wherein said imprinting is accomplished by applying numeric digit indicia to the inner faces of the cover sheets and overlying said indicia by background-forming imprinting of a contrasting color.

7. The method of claim 1 wherein said row header strips are all of the same horizontal and vertical adjacent extent, and the numeric digit sign component pieces are of the same horizontal and vertical extent relative to each other and are of the same vertical extent as that of said row header strips.

8. The method of claim 2 wherein the numeric digit sign component pieces are of the same horizontal and vertical extent relative to each other and are of the same vertical extent as that of said row header strips.

9. The method of claim 7 wherein said cutting devices include a first cutting device with a backstop positioned to effect a linear cutting operation spaced a distance therefrom equal to said vertical extent of said row header strips and numeric sign component pieces; a second cutting device with a backstop positioned to effect a second cutting operation spaced a distance therefrom equal to the horizontal extent of head row header strips; a third cutting device having a backstop positioned to effect a third cutting operation spaced a distance therefrom equal to the horizontal extent of said corresponding sign component pieces; and each of said various cutting operations are performed using the cutting device adapted to provide the appropriate cutting distances by applying the appropriate edge of the piece being cut to the backstop of the device involved.

10. The method of claim 8 wherein said cutting device include a first cutting device with a backstop positioned to effect a linear cutting operation spaced a distance therefrom equal to said vertical extent of said numeric sign component pieces; a second cutting device having a backstop positioned to effect a second cutting operation spaced a distance therefrom equal to the horizontal extent of said corresponding numeric sign component pieces; and each of said various cutting operations are performed using the cutting device adapted to provide the appropriate cutting distances by applying the appropriate edge of the piece being cut to the backstop of the device involved.

11. The method of claims 1, 2, 8 or 9 wherein said backstops are adjustable in position in directions transverse to the lengths thereof.

12. A method of making a plurality of thin, flat, rectangular, flexible, sign component pieces to be arranged on a flat backing surface in close horizontal and vertical relationship so as to fill an entire sign-forming area of the sign and so that the sign component pieces from a distance appear to form a single sheet sign having one continuous flat surface, said method comprising the steps of: imprinting on a face of a thin, flexible, rectangular sheet bands of indicia sharing common cut reference lines so that severing said sheet along three or more successive cut lines completely separates two or more bands of such indicia from the sheet; and severing said sheet first along said cut reference lines to form strips of such indicia, and then cutting said strips, where necessary, transversely of the strips to form the individual sign component pieces, said severing operations forming complementary bevelled edges at the confronting edges of the sign component pieces separated along the same cut lines.

13. The method of claim 12 wherein said imprinted bands of indicia are precisely positioned with respect to two intersecting reference margins of the sheet.

14. A method of making a plurality of thin, flat, rectangular, flexible, sign component pieces to be arranged on a flat backing surface in close horizontal and vertical relationship so as to fill an entire sign-forming area of the sign and so that the sign component pieces from a distance appear to form a single sheet sign having one continuous flat surface, said method comprising the steps of: providing a thin, flexible sheet with sign-forming indicia arranged in parallel bands therealong, said bands sharing common cut reference lines so that severing said sheet along three or more successive cut lines completely separates two or more bands of such indicia from the sheet, and severing said sheet first along said cut reference lines to form strips of such indicia, and then cutting said strips, where necessary, transversely of the strips to form the individual sign component pieces, said severing operations forming complementary bevelled edges at the confronting edges of the sign component pieces separated along the same cut reference lines.

15. The method of claim 12 or 14 wherein the shearing of the top and right side of each component piece is made to effect an identical beveled undercut and the shearing of the left and bottom side of each component piece is made to effect an identical opposite beveled undercut.

16. The method of claim 15 wherein there is provided a separate cutting device with a backstop positioned to effect a linear cutting operation spaced a distance therefrom equal to each different vertical extent of a component piece, a separate cutting device having a backstop positioned to effect a cutting operation spaced a distance therefrom equal to each different horizontal extent of a component piece.

17. The method of claims 1, 2 or 12 wherein said severing or shearing operations are performed by scissors edge severing or shearing devices.

18. The methods of claim 1, 2 or 12 wherein said severing or shearing operations are performed by a scissors edge severing or shearing devices which have flat outer cutting edges.

* * * * *